United States Patent Office 3,337,893
Patented Aug. 29, 1967

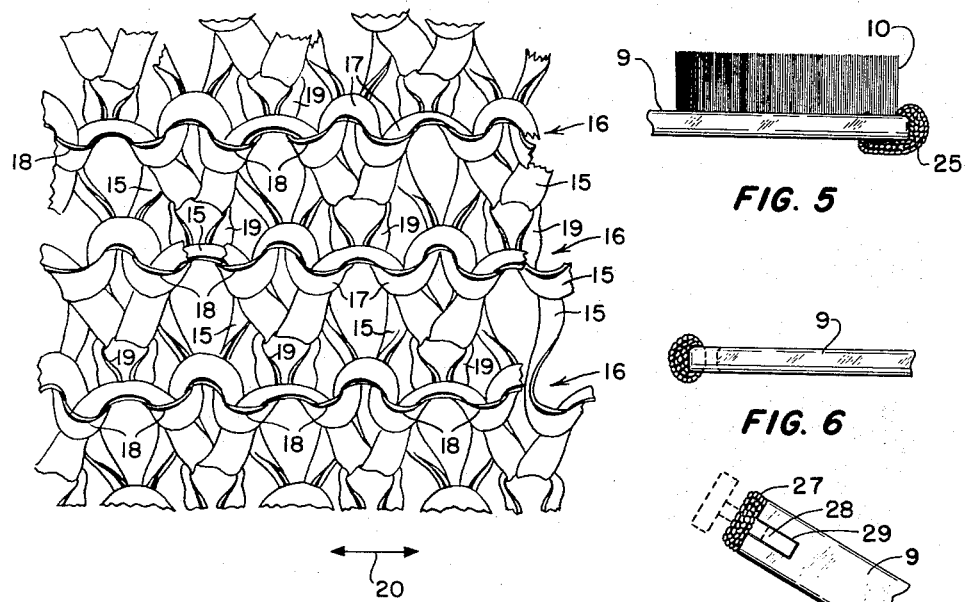

3,337,893
TOOTH CLEANING IMPLEMENT
Ralph Fine, East Brunswick, and Virgil John Richter, West Orange, N.J., assignors to Colgate-Palmolive Company, New York, N.Y., a corporation of Delaware
Filed July 29, 1964, Ser. No. 385,918
7 Claims. (Cl. 15—111)

This invention relates to tooth cleaning implements and particularly to a special implement having a contour conforming tooth cleansing surface.

In its preferred embodiment the tooth cleaning implement of the invention comprises a handle on one end of which is mounted the usual bristles in combination with a special working unit comprising a mesh fabric casing enclosing a relatively soft resilient body of synthetic plastic such as polyurethane sponge material. As will appear the casing is preferably formed by interweaving narrow thin strips or strands of hard plastic polyester film thickness material.

It is the major object of this invention to provide a novel tooth cleaning implement having a resiliently backed contour conforming cleansing and scraping surface mounted adjacent a bristle unit.

A further object of the invention is to provide a novel tooth cleaning implement having a tooth engaging surface comprising a water resistant plastic fabric formed with a multiplicity of discrete scraper elements.

Another object of the invention is to provide a novel tooth cleaning implement wherein a resilient body of cellular material is enclosed within a casing of open mesh fabric that is woven from thin strips of hard plastic water repellant material having a plurality of portions twisted to present sharp scraper edges. Preferably the body is polyurethane sponge or foam, and the strips are of a polyester film such as polyethylene terephthalate resin.

Further objects of the invention will appear as the description proceeds in connection with the appended claims and the annexed drawings wherein:

FIGURE 1 is a top plan view of a tooth cleaning implement according to a preferred embodiment of the invention;

FIGURE 2 is a bottom plan view of the implement of FIGURE 1, partially broken away and sectioned to show internal structure of the scraping and cleansing unit;

FIGURE 3 is a side elevation of the implement of FIGURES 1 and 2, partially broken away and sectioned to show further internal structure of the scraping and cleansing unit;

FIGURE 4 is an enlarged view substantially showing the nature of the mesh fabric of the casing of the scraping and cleansing unit of FIGURES 1–3;

FIGURE 5 is an elevation showing the scraping and cleansing unit on the end of the handle;

FIGURE 6 is a fragmentary view showing another position of the scraping and cleansing unit on the handle; and FIGURE 7 is a fragmentary view showing a removably mounted scraping and cleansing unit on the bristle end of the handle.

The tooth cleaning implement comprises a handle that is a beam of generally conventional shape, usually integrally formed of a plastic material that is hard, smooth and does not absorb water. A bristle unit 10 of usual structure is mounted, as by imbedding the bristles into one end of the handle.

At the bristle end the handle has a flat longitudinal back surface 12 upon which is secured a scraping and cleaning pad unit 11 in the form of an open mesh casing 13 of special characteristics loosely enclosing a generally rectangular integral block 14 of soft resilient cellular plastic material such as foamed polyethylene.

Casing 13 is formed by weaving together a number of narrow thin hard strips 15 cut from sheet polyester material of film thickness. This material is preferably the highly durable, water repellant polyethylene terephthalate resin known by the trade name of Mylar. It is entirely stable thermally within the range of temperatures likely to be encountered during manufacture, packing, shipping and use of the toothbrush.

This material is also resistant chemically to acids and like agents it is likely to encounter in saliva or the usual tooth pastes and powders.

In practice a sheet of this polyester material in the range of 0.00025″ to 0.0075″ thick is sliced into narrow strips about one-tenth of an inch or so wide. The opposite side edges of these strips form sharp corners. These strips are woven together in such twisted fashion that at the surface of the mesh they form a multiplicity of discrete scraper elements, represented by twisted portions of the strip extending along the mesh surface in such fashion as to present rows of such scraper elements.

With reference to FIGURE 4, it will be noted that the interwoven narrow strips 15 provide rows 16 of scraper elements formed by twisted flexible strip portions 17 disposed at an angle to the general plane of the open mesh fabric so that their sharp opposite edges indicated at 18 appear as the scraper elements. FIGURE 4 shows a weave wherein twisted strip portions extend at an angle to the mesh to similarly dispose the hard sharp edges of the strips may be used.

Intermediate the scraper elements 18 the strips 15 are formed with loops 19 that permit resilient stretching of the mesh fabric in the direction of the arrow 20 in FIGURE 4 which is laterally of the casing 13, but the weave permits little or no stretching at ring angles to that direction. Thus scraper elements 18 are resiliently interconnected.

In making the toothbrush the open mesh casing 13 wholly but relatively slackly encloses the soft integral block 14, and a layer of adhesive 21 permanently secures the assembly to flat surface 12 of the handle. Within the casing 13, block 14 is free to resiliently deform with its surfaces moving relatively to the mesh surfaces.

Preferably the mesh is so arranged that rows 16 extend transversely of the implement as indicated in FIGURE 3, whereby exteriorly the working surface 22 which contacts the teeth has a plurality of short longitudinally spaced substantially parallel transverse rows of irregularly spaced resiliently interconnected scraper elements 18 whose sharp edges face mainly longitudinally of the handle.

In use, before the bristle unit 10 is applied to the teeth, the implement surface 22 is placed in contact with the tooth surfaces and the implement is moved like the ordinary toothbrush with mainly longitudinal and circular motions. The soft resilient body 14 underlies the mesh surface 22 as the latter conforms itself to the tooth surface contours, and provides a spongy conforming shock absorbing backing for the surface 22. The sharp edges of the multiplicity of small scraper elements scrape tartar, tobacco stain and like coatings from the tooth surfaces without damaging the tooth enamel. The body 14, besides resiliently backing the fabric of casing 13, provides and maintains a reservoir for moisture such as water. This reservoir is charged by dipping the casing into the tap water before applying tooth powder or paste to surface 22, and its capacity is preferably sufficient for the entire operation. Brushing with the bristle unit and rinsing completes the cleansing operation.

FIGURES 5, 6 and 7 show other modes of mounting the scraping and cleansing pad unit according to the invention.

FIGURE 5 shows a pad unit 25 that occupies only part of the back of the handle at the bristle end and extends over and is attached to the end of the handle. FIGURE 6 shows a pad unit 26 covering and extending over the entire handle end beyond the bristles. Both pad units 25 and 26 are constructed like pad 11 and are permanently attached to the handle like pad 11.

FIGURE 7 shows a form of the invention wherein the scraping and cleansing unit pad 27 is mounted on a plug 28 that is frictionally fitted within a bore 29 in the end of the handle beyond the bristles. Pad 27 itself is of the same structure as pad 11 and is permanently attached to the plug. The plug 28 is removable and replaceable by a new plug and pad assembly when worn or defective.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a tooth cleaning implement, a handle, a bristle unit mounted on said handle at one end thereof for removing food and like particles from the teeth, and a scraping and cleaning unit mounted on said handle for removing harder substances from the teeth including tartar and tobacco stain, said scraping and cleaning unit comprising an open mesh fabric backed by a resilient member and having a series of thin, narrow strands extending mainly transversely of the longitudinal axis of said handle and being woven in a predetermined pattern that provides for looped portions forming a multiplicity of discrete, sharp-edged scraper elements, said scraper elements being arranged along each strand in a row extending transversely of said longitudinal axis and having sharp edges directed longitudinally with respect to said axis, with each row being generally parallel to and spaced apart from its adjacent row of scraper elements.

2. The tooth cleaning implement defined in claim 1 wherein said bristle unit and said scraper and cleaning unit are on directly opposite face sides of said handle adjacent to said one end.

3. The tooth cleaning implement defined in claim 2 wherein each of said looped portions are twisted with said scraper elements extending outwardly from the general plane of said mesh fabric at a predetermined angle thereto.

4. The tooth cleaning implement defined in claim 2 wherein said strands are formed from polyester plastic of film thickness.

5. The tooth cleaning implement defined in claim 2 wherein said mesh fabric forms a casing enclosing said resilient member and wherein said casing is secured to said handle by adhesive.

6. The tooth cleaning implement defined in claim 1 wherein said strands are formed from polyethylene terephthalate resin and have a thickness of about 0.0025 to 0.0075 inches.

7. The tooth cleaning implement defined in claim 6 wherein adjacent ones of said scraper elements in each row are resiliently joined together with looped sections in each strand to enable said strands to be stretched transversely of said longitudinal axis.

References Cited
UNITED STATES PATENTS

| 158,099 | 12/1874 | Lowd | 15—167 |
| 160,552 | 3/1875 | Stevens | 15—210 |
| 1,360,292 | 11/1920 | Hartman | 15—167 |
| 2,555,858 | 6/1951 | Olesky | 15—167 |
| 2,877,483 | 3/1959 | Alvistur | 15—210 |
| 3,038,187 | 6/1962 | Nathanson | 15—118 |
| 3,252,176 | 5/1966 | Gropper | 15—209 |

FOREIGN PATENTS

| 988,236 | 4/1965 | Great Britain. |
| 1,232,700 | 4/1960 | France. |

CHARLES A. WILMUTH, *Primary Examiner.*

L. G. MACHLIN, *Assistant Examiner.*